(12) United States Patent
Yamada et al.

(10) Patent No.: US 11,959,148 B2
(45) Date of Patent: Apr. 16, 2024

(54) PREVENTIVE MAINTENANCE CONSTRUCTION METHOD FOR STEEL BRIDGE

(71) Applicant: YAMADA INFRA TECHNOS CO., LTD., Aichi (JP)

(72) Inventors: Hirofumi Yamada, Aichi (JP); Shohei Yamada, Aichi (JP)

(73) Assignee: YAMADA INFRA TECHNOS CO., LTD., Aichi (JP)

( * ) Notice: Subject to any disclaimer, the term of this patent is extended or adjusted under 35 U.S.C. 154(b) by 0 days.

(21) Appl. No.: 17/690,803

(22) Filed: Mar. 9, 2022

(65) Prior Publication Data
US 2023/0287536 A1    Sep. 14, 2023

(51) Int. Cl.
B23P 9/04 (2006.01)
C21D 7/06 (2006.01)
C21D 11/00 (2006.01)

(52) U.S. Cl.
CPC ............ *C21D 11/00* (2013.01); *B23P 9/04* (2013.01); *C21D 7/06* (2013.01)

(58) Field of Classification Search
CPC ....................................................... B23P 9/04
See application file for complete search history.

(56) References Cited

U.S. PATENT DOCUMENTS 3,950,642 A * 4/1976 Feld .................... C21D 7/06
451/39
2011/0284508 A1* 11/2011 Miura ................ B23K 31/125
219/121.64

FOREIGN PATENT DOCUMENTS

| CN | 108707741 A | * 10/2018 | ............. C21D 10/00 |
| JP | 10258394 A | * 9/1998 | |
| JP | H11-207624 A | 8/1999 | |
| JP | 2006-102738 A | 4/2006 | |
| JP | 2006-142367 A | 6/2006 | |
| JP | 2016-065443 A | 4/2016 | |
| JP | 2020159098 A | * 10/2020 | |

OTHER PUBLICATIONS

English Machine Translation of JP2020159098A, Yamada et al. (Year: 2020).*
English Machine Translation of JP2016065443A, Yamada et al. (Year: 2016).*
English Machine Translation of JP10258394A, Niwa, Tadashi and Hase, Yoshihiro (Year: 1998).*
English Machine Translation of CN 108707741 A (Abstract & Claims) (Year: 2018).*

* cited by examiner

*Primary Examiner* — Sarang Afzali
(74) *Attorney, Agent, or Firm* — Rimon P.C.

(57) ABSTRACT

A preventive maintenance method includes performing abrasive blast-cleaning; performing shot peening: applying a fluorescent coating material before the shot peening is performed; and irradiating a portion applied with the fluorescent coating material with an ultraviolet ray after the shot peening is performed. Coverage is calculated based on a residual fluorescent coating material that fluoresces.

1 Claim, 4 Drawing Sheets

PREVENTIVE MAINTENANCE CONSTRUCTION METHOD FOR STEEL BRIDGE

BACKGROUND OF THE INVENTION

Field of the Invention

The present invention relates to a preventive maintenance method for coating a surface of a steel bridge.

Background Art

Conventionally, preventive maintenance has been performed for a steel bridge regardless of whether the steel bridge is newly constructed or has existed in order to prevent rusting and the like of the steel bridge or, in particular, to update corroded coating by aged deterioration on the existing steel bridge. Such preventive maintenance requires removal of rust and the like and removal of an old coat, just as described. Thus, in recent years, the rust and the coat are removed by abrasive blast-cleaning (first-grade surface preparation), and thereafter the steel bridge is newly coated (for example, see Patent document 1).

In addition, weld strength of the steel bridge possibly varies by site. For example, in the case of a steel road bridge, the entire bridge swings or oscillates when a vehicle passes or a blast of wind hits the bridge. As a result, such a problem occurs that a fatigue crack is developed from the weld site where the weld strength varies. In reality, repair of such a fatigue crack requires enormous cost.

For example, Patent document 2 discloses a method for preventing formation of the crack by applying a primer to a structurally uncontinued portion produced by a weld joint of a steel structure.

In addition, Patent document 3 discloses a fatigue performance improving method for the weld joint in which ultrasonic impact treatment is performed on an end surface of the weld joint and a weld toe at an end of the weld joint.

Here, it is predicted that application of the conventional configuration as described above to the repair of the steel bridge extends a construction period and requires enormous cost. Meanwhile, the inventor of the present application has proposed a maintenance coating method for the steel structure as disclosed in Patent document 4. In the maintenance coating method for the steel structure, abrasive blast-cleaning and peening are performed in succession.

CITATION LIST

Patent Document

Patent document 1: Japanese Patent Application Publication No. 11-207624
Patent document 2: Japanese Patent Application Publication No. 2006-102738
Patent document 3: Japanese Patent Application Publication No. 2006-142367
Patent document 4: Japanese Patent Application Publication No. 2016-65443

SUMMARY OF THE INVENTION

Problem to be Solved by the Invention

Under the above-described background circumstances, the conventional method has the following problems. Work of visually checking a state of fatigue is extremely cumbersome and complicated since a curing space, which has scaffolds being built, is boarded up to prevent leakage of dust, and thus is in a sealed state, is a dark place where no light can reach. Another problem is that, when a repair surface, which is formed with a large number of asperities by the abrasive blast-cleaning, is then subjected to the peening, it becomes impossible to determine whether the asperities are formed in such an area by the peening or the abrasive blast-cleaning. Furthermore, for steel bridges built in recent years, it is possible to perform random inspections at a factory or the like in advance in a state of parts before construction. However, for old steel bridges that have already been built without prior inspection, an appropriate inspection method has not been established.

In view of the above, the present invention has a purpose of providing a preventive maintenance method for a steel bridge capable of significantly shortening a construction period, thereby significantly reducing cost, and further appropriately determining whether peening has been performed appropriately.

Means for Solving the Problem

The present invention (the first invention) is a preventive maintenance method for a steel bridge including: an abrasive blast-cleaning step in which abrasive blast-cleaning is performed by using grit as an abrasive for surface preparation of the steel bridge including a weld site; and a peening step in which shot peening is performed by using shot in order to improve fatigue strength of a portion subjected to the surface preparation. The preventive maintenance method further includes: a fluorescent coating material application step in which a fluorescent coating material is applied to a portion subjected to the peening step after the abrasive blast-cleaning step and before the peening step; and a coverage determination step in which, after the peening step is performed and the fluorescent coating material applied in the fluorescent coating material application step is partially removed, a portion applied with the fluorescent coating material is irradiated with an ultraviolet ray, so as to calculate coverage on the basis of a residual fluorescent coating material that fluoresces, and it is determined whether the coverage is a specified standard determination value or higher. In the case where the calculated coverage is the standard determination value or higher, the peening step is completed. In the peening step, the shot strikes an end portion formed at the weld site, so as to plastically deform the end portion, and a concave R surface is formed at a boundary between a surface of the weld site and a surface of a non-weld site adjacent to the weld site.

It is desired to be configured that, in the coverage determination step, in the case where the calculated coverage is 90% or higher, the peening step is completed, and, in the case where the coverage is lower than 90%, the fluorescent coating material application step is performed again, the peening step is then performed again, and the coverage determination step is then performed again.

Furthermore, in the coverage determination step, in the case where the calculated coverage is 90% or higher, the fluorescent coating material application step may be performed again, the peening step may then be performed again, the coverage determination step may then be performed again. In the case where the calculated coverage is 90% or higher again, the peening step may be completed.

In such a configuration, for example, when work is shifted from the abrasive blast-cleaning to the peening on the steel bridge (may be a newly constructed steel bridge or may be an existing steel bridge), the shot peening can be performed on a base surface, which is formed by the abrasive blast-cleaning, in the same state. Thus, there is no need to separately perform the work. As a result, a work period can effectively be shortened, and cost can be cut. Further in detail, for the abrasive blast-cleaning, in general, scaffolds are assembled, and a dust-proof sheet is spread to prevent leakage of dust to the outside. However, in the present invention, the peening can be performed without taking away such peripheral facilities. This eliminates wasteful time and cost of the work.

Furthermore, since the fluorescent coating material application step is performed after the abrasive blast-cleaning step, an effect of the peening can appropriately be determined in the coverage determination step without being affected by asperities on a surface of the steel bridge formed in the abrasive blast-cleaning step. In particular, in the case where the coverage is 90% or higher, it can be determined that fatigue strength can sufficiently be improved. Meanwhile, in the case where the coverage is lower than 90%, it is determined that improvement in the fatigue strength is insufficient. Consequently, the processing returns to the fluorescent coating material application step. In this way, the fatigue strength can appropriately be improved.

In addition, when the coverage is calculated, the fluorescent coating material, which is easily identified even in a dark place such as a curing space. Thus, appropriate measurement can be made.

In addition, in the peening step, the end portion formed at the weld site is plastically deformed to form the concave R surface. In this way, the fatigue strength can be improved. Upon coating, the coating material can favorably adhere to the weld site.

The preventive maintenance in the present invention includes maintenance work that is performed to prevent corrosion of the newly-constructed steel bridge or the existing steel bridge. Each of the abrasive blast-cleaning, the grit, and the shot is defined in JIS Z 03120:2004 "Abrasive blast-cleaning methods for surface preparation". More specifically, the abrasive blast-cleaning is to "clean and roughen the surface of steel product by directing blast-cleaning abrasive, to which high kinetic energy is given, on the surface of steel product to be treated in order to remove the oxides or substances deposited on the surface of steel product by finely cutting and striking that surface". The grit is "particles, before use, that are predominantly angular, that have sharp edges and that are less than half-round in shape". The shot is "particles, before use, that are predominantly round, whose longer diameter is within twice the shorter diameter, without sharp angle, broken surface or other sharp surface defects". In the abrasive blast-cleaning, the "blast-cleaning abrasive" has the same definition as the "grinding material" as described above. In addition, in JIS B 2711: 2013 "Springs-shot peening", shot peening is "cold work applied to the surface of a spring, to improve its fatigue strength and stress corrosion cracking resistance, by a stream of near-spherical hard particles at a high velocity that generates compressive residual stresses and work hardening in the surface layer". However, a surface treatment method that is referred to as the shot peening and that is performed on a metal material other than the spring is commonly adopted, and the shot peening for the steel bridge in the present invention is also defined the same. That is, the grit is the abrasive used for the abrasive blast-cleaning in the present invention, and the shot is the hard particles used for the shot peening. Here, so-called steel cut wire grit may be adopted as the grit. So-called round cut wire shot may be adopted as the shot.

The present invention (the second invention) is a preventive maintenance method for a steel bridge including a peening step in which shot peening is performed by using shot in order to improve fatigue strength of an already-coated steel bridge. The preventive maintenance method for a steel bridge further includes a coverage determination step in which, after a coat of the steel bridge is partially removed in the peening step, coverage is calculated on the basis of the coat, and it is determined whether the coverage is a specified standard determination value or higher. In the case where the calculated coverage is the standard determination value or higher, the peening step is completed. In the case where the calculated coverage is lower than the standard determination value, a fluorescent coating material application step in which a fluorescent coating material is applied to a portion subjected to the peening step is performed. Next, the peening step is performed again. After the fluorescent coating material applied in the fluorescent coating material application step is partially removed, a portion applied with the fluorescent coating material is irradiated with an ultraviolet ray, so as to calculate the coverage on the basis of a residual fluorescent coating material that fluoresces. Then, in the case where the calculated coverage is the standard determination value or higher, the peening step is completed. In the peening step, the shot strikes an end portion formed at the weld site, so as to plastically deform the end portion, and a concave R surface is formed at a boundary between a surface of the weld site and a surface of a non-weld site adjacent to the weld site.

Here, depending on a situation at the site, the abrasive blast-cleaning and the peening are preferably performed in a reverse order. With the above configuration, the first fluorescent coating material application step in the peening step of the first invention in the present invention can be omitted.

Advantageous Effects of Invention

In the preventive maintenance method for a steel bridge according to the present invention, the coverage can accurately and appropriately be calculated even in a dark place, and the preventive maintenance can thereby be performed.

BRIEF DESCRIPTION OF DRAWINGS

FIGS. 3A and 3B include schematic explanatory views for illustrating a peening step for a weld site according to the embodiment, in which FIG. 3A illustrates a state before the peening step, and FIG. 3B illustrates a state after the peening step.

DESCRIPTION OF EMBODIMENTS

A description will hereinafter be made on an example in which a preventive maintenance method for a steel bridge according to the present invention is embodied. The present invention is not limited to the embodiment, which will be described below, and design thereof can appropriately be changed.

(Preparation)

Figure 1:
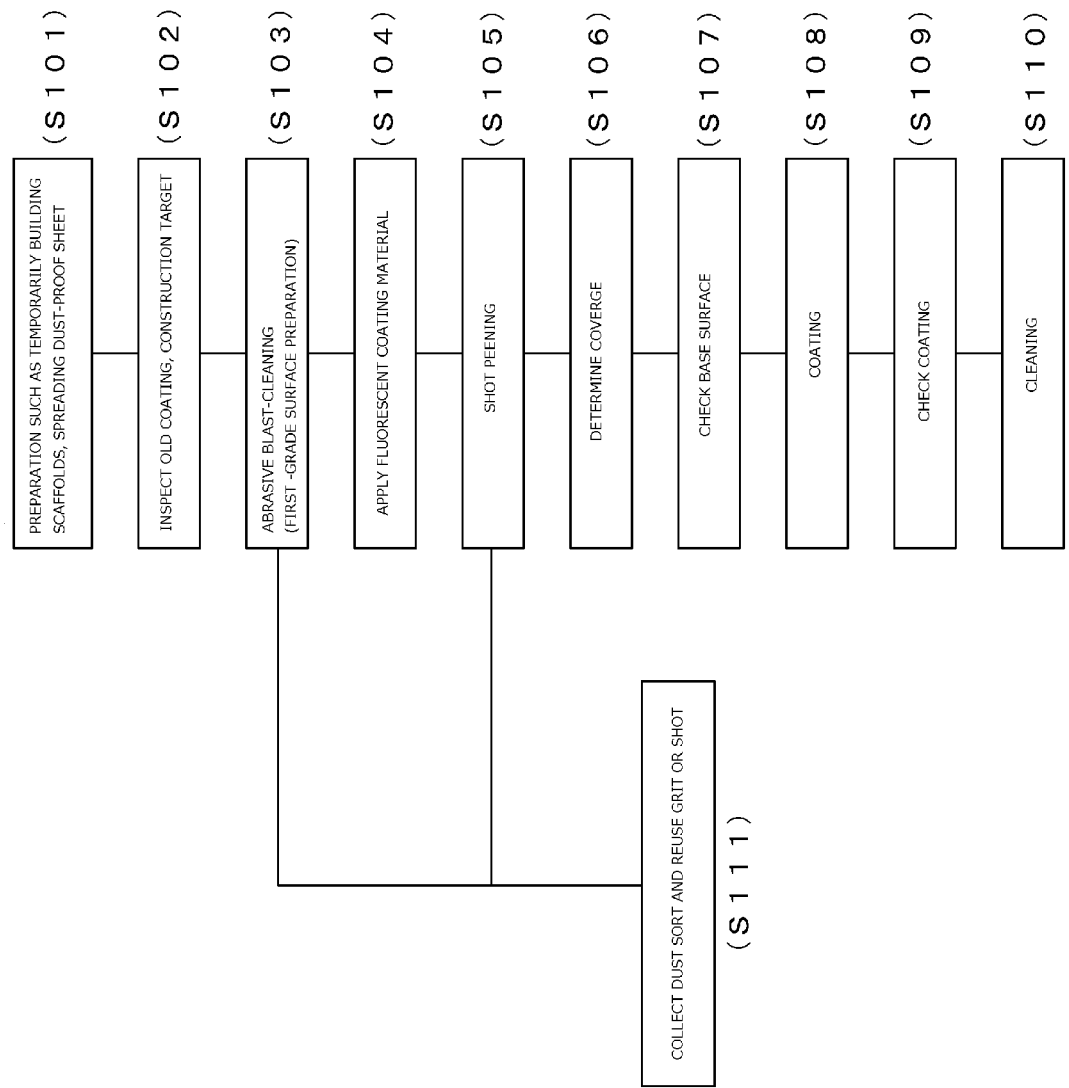
FIG. 1 is a flowchart illustrating a procedure of preventive maintenance for a steel bridge according to an embodiment.

As illustrated in FIG. 1, as a procedure of preventive maintenance (recoating) for an existing steel bridge (steel structure), first, scaffolds are temporarily built for the steel bridge as a target of the preventive maintenance. In addition to the above, preparation (S101) is performed by spreading a dust-proof sheet to prevent leakage of dust to the outside, curing an uncoated portion, and installing a device that performs abrasive blast-cleaning and shot peening.

(Inspection)

Thereafter, a type and a thickness of an old coating material that has been applied to the steel bridge, or a condition of the steel bridge and the like is inspected (S102). Then, based on the inspection result, a type, an ejection speed, and the like of grit or shot to be used are determined. The grit (non-spherical) or the shot (spherical) to be selected herein is defined in JIS Z 0310: 2004.

(Abrasive Blast-Cleaning Step)

Then, abrasive blast-cleaning is first performed by using the grit that has been determined in S102 (S103). More specifically, a coat or the like to be removed from the steel bridge is removed, and surface preparation is performed on a portion to be surface-prepared. Here, the dust is produced by the coat, rust, and the like removed by the abrasive blast-cleaning and by the used grit. However, since the dust-proof sheet is spread in S101, the dust is not leaked to the outside, and the dust is accumulated in a worksite. The abrasive blast-cleaning is basically performed for an entire area to be coated in a coating step, which will be described below. In addition, the abrasive blast-cleaning constitutes the abrasive blast-cleaning step according to the present invention.

(Fluorescent Coating Material Application Step)

After the abrasive blast-cleaning step, a fluorescent coating material is applied to a portion to be shot-peened (S104). As the fluorescent coating material, a well-known fluorescent coating material such as LOIHI COLOR NEO (manufactured by SINLOIHI CO., LTD) can preferably be used. Step S104 of applying the fluorescent coating material constitutes the fluorescent coating material application step according to the present invention.

Next, a blasting device that has ejected the grit is loaded with the shot, which has been determined in S102, instead of the grit, and is thereby prepared to eject the shot. Here, the scaffolds, which have temporarily been built, and the dust-proof sheet remain used without being taken away.

(Peening Step)

Then, an abrasive-blast cleaned portion (that is, a surface-prepared portion) that includes a base surface formed by the abrasive blast-cleaning is shot-peened by the blasting device in which the shot is loaded (S105). By such shot peening, fatigue strength and stress corrosion cracking resistance of the base surface are improved. The used shot produced by the shot peening is mixed with the used grit in S103 and accumulated as the dust in the worksite. Since the shot strikes the fluorescent coating material, which has been applied in the fluorescent coating material application step, the fluorescent coating material is removed. By the way, the shot peening may be performed on the entire base surface, which has been subjected to the abrasive blast-cleaning, or may partially be performed on a periphery of a weld site, a portion whose strength is concerned, or the like. The shot peening constitutes the peening step according to the present invention.

(Coverage Determination Step)

When the peening step is completed, the shot-peened portion is irradiated with ultraviolet rays, so as to calculate coverage on the basis of a residual fluorescent coating material that fluoresces (S106). For example, a coverage checker (a coverage checker manufactured by TOYO SEIKO CO., LTD.) can preferably be used to calculate the coverage.

Figure 2:
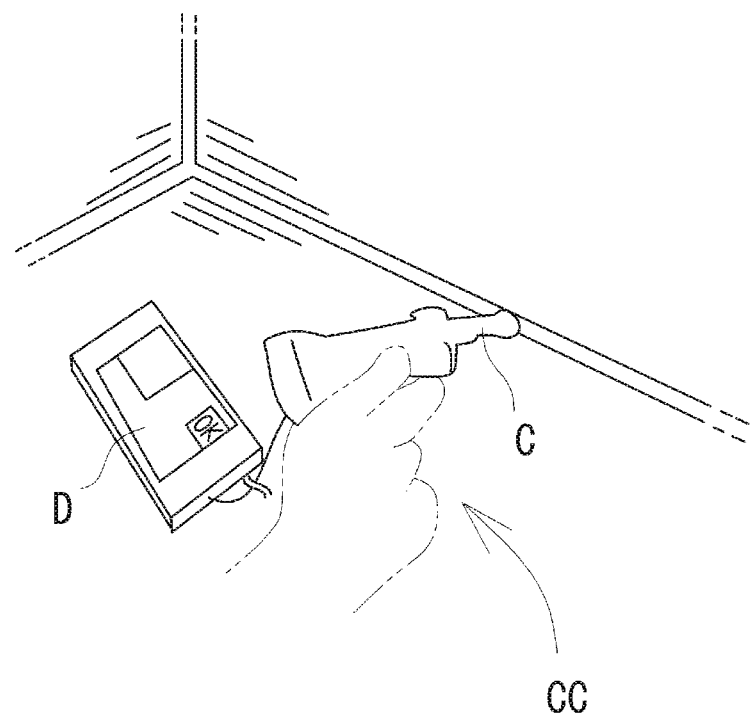
FIG. 2 is a schematic explanatory view for illustrating a coverage determination step according to the embodiment.

More specifically, as illustrated in FIG. 2, a remote camera section C of a coverage checker CC is pointed at the base surface, and the ultraviolet ray is emitted from a tip of the remote camera section C. In this way, the remote camera section C receives fluorescence that is emitted from the residual fluorescent coating material on the base surface. Then, information on the received light is shown on a display D of the coverage checker CC, and the calculated coverage can thereby be checked.

Here, in this embodiment, the coverage is calculated twice for the same portion. More specifically, in the case where the calculated coverage is 90% or higher (a standard determination value or higher) (first time), the fluorescent coating material application step is performed again, the peening step is then performed again, and the coverage determination step is then performed again. Thereafter, in the case where the calculated coverage is 90% or higher again (second time), it is determined that compressive residual stress has been applied, the peening step is thus completed, and processing proceeds to S107. On the other hand, in the case where a value that is lower than 90% (lower than the standard determination value) is calculated even once, it is determined that the shot peening is insufficient, and the processing proceeds to S104. The step of calculating the coverage constitutes the coverage determination step according to the present invention.

As it has been described so far, since the fluorescent coating material is used to determine the coverage, the coverage can appropriately be calculated in a curing space that particularly has an intricate structure such as of the steel bridge and where sunlight is blocked by the dust-proof sheet and the like and thus light cannot reach. In particular, since the shot peening is frequently performed on a welded portion (such as a corner or an edge) of a steel material, it is often difficult to check such a portion visually. However, since the above determination for such a portion is made on the basis of the fluorescence, and this configuration exerts an extremely advantageous effect.

(Surface Check)

After the coverage determination step, the base surface, which has been subjected to the abrasive blast-cleaning and the shot peening, is finally checked (S107). In this embodiment, since the shot-peened portion has already been checked in advance in the coverage determination step, the surface check is mainly performed on the abrasive-blast cleaned portion. Such a final check is not limited to a visual check, and examples of the final check are comparison of the base surface with pictorial standards in ISO 8501 and a roughness check by using a surface roughness tester. In this way, it is checked whether the unremoved coat remains, whether the roughness of the base surface conforms with the standard, or the like. Thus, an appropriate process is performed on an insufficiently treated portion. For example, a portion on which the abrasive blast-cleaning cannot be performed is subjected to the surface preparation by using a hand tool or the like.

(Coating)

Final finish coating is performed to form a finishing coat on the portion, the base surface of which has been checked as described above (S108). Such coating is generally performed plural times to form layered coats, and includes, for example, under coating as rust-proof coating, intermediate coating to protect the rust-proof coat, and top coating as the final finish coating.

(Coating Check)

When the coating is finished, the coat is checked (S109). Such a check is not limited to a check of a thickness of the dried coat, but includes a check of a thickness of the wet coat by using a wetness gauge during coating work, and the like, for example. In addition, such a check is performed not only after the top coating as the final finish coating but also after the under coating and the intermediate coating.

(Cleaning)

When the coating work is completed with the check, the site is cleaned (S110). More specifically, the scaffolds, the dust-proof sheet, and the like are collected, and the blasting/shot peening ejection device is uninstalled to complete the preventive maintenance.

(Collection)

Along with the above procedure, a dust collection step is simultaneously performed (S111). More specifically, the dust including the used grit produced by the abrasive blast-cleaning (S103), the used shot produced by the shot peening (S105), or the removed coat, the rust, and the like produced in the steps is collected and sorted.

Both of the used grit and the used shot, which are collected, are iron (metallic) abrasives defined in JIS Z 0310:2004. Thus, even when the grit or the shot hits the steel bridge during use, the grit or the shot is not crushed unlike almandine garnet or iron slag and thus can be reused. Of the grit or the shot, high-carbon cast-steel grit or shot can be reused about 600 times, and thus is extremely economical. In addition, an amount of waste can significantly be reduced by sorting such grit or shot from the removed coat and the other foreign substances.

Figure 3A:
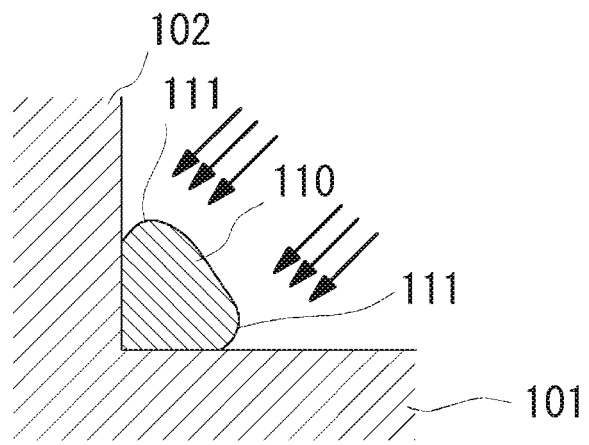
Figure 3B:
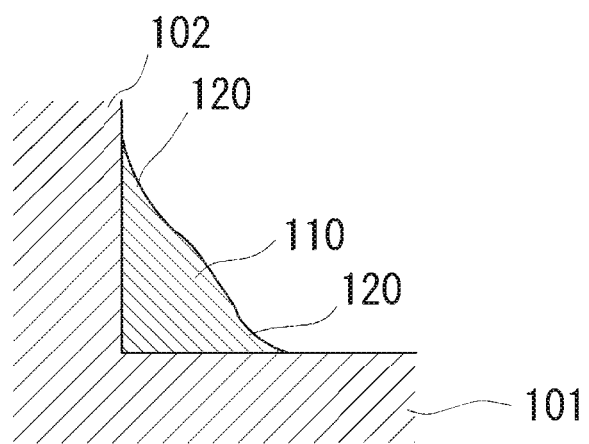

A further detailed description will herein be made on the peening (S105). In the peening, as illustrated in FIG. 3A, the shot strikes a weld site 110, at which a steel material 101 and a steel material 102 are welded, in a corner portion, for example, to plastically deform an end portion 111 at the weld site 110. In this way, as illustrated in FIG. 3B, a concave R surface 120 is formed at a boundary between a surface of the weld site 110 and a surface of a non-weld site adjacent to the weld site 110. The formation of the R surface 120 exposes the entire surface to the outside around the weld site 110 and suppresses a coating defect in the coating work. Naturally, the fatigue strength and the stress corrosion cracking resistance can be improved by the peening.

It is possible to determine whether a curved surface shape is appropriately formed in the above-described R surface 120 by touching the relevant portion with a tip of a so-called ball gauge. As another method, a non-contact measuring instrument can be used instead of the ball gauge so as to check, without contact, whether the R surface 120 has the appropriate curved surface shape.

A description will hereinafter be made on a circulation-type blasting device 1 as an example. The circulation-type blasting device 1 can eject both of the grit and the shot, and can collect and sort the used grit, the used shot, the removed coat, and the like.

Figure 4:
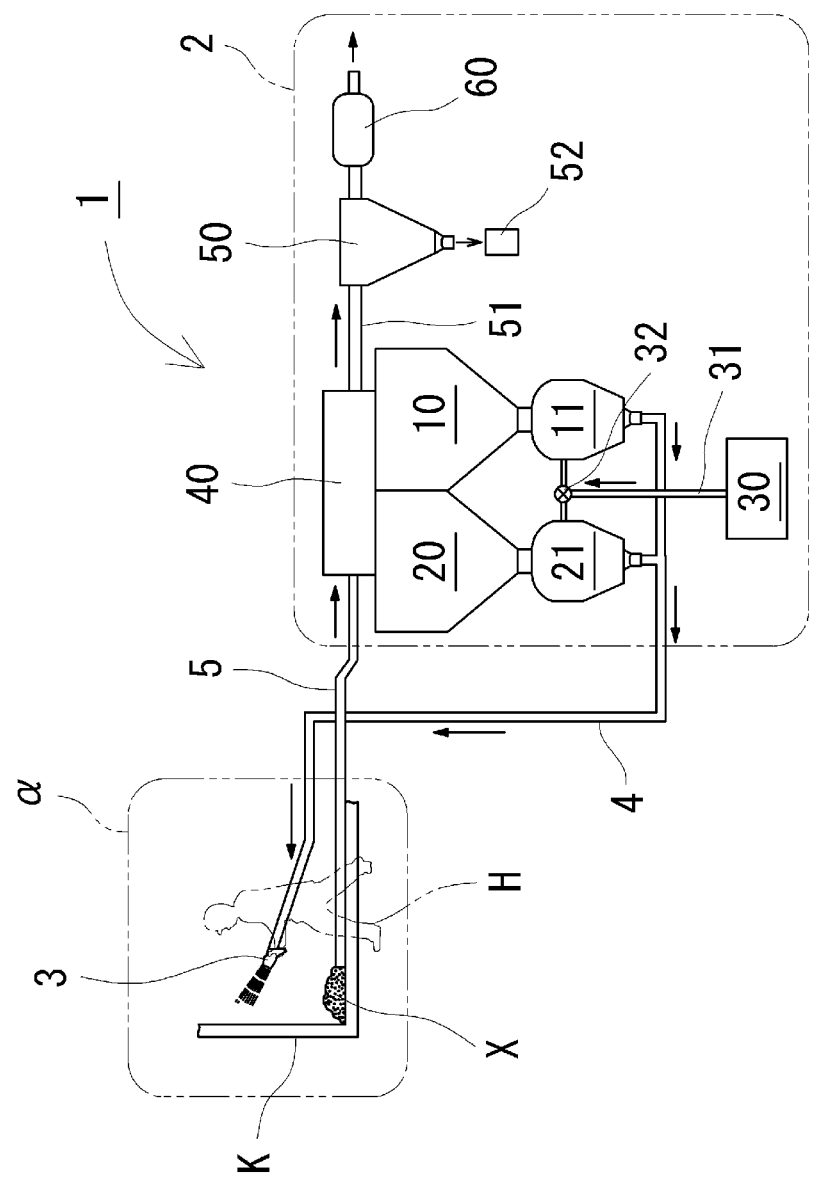
FIG. 4 is a schematic explanatory view for illustrating a circulation-type blasting device according to the embodiment.

As illustrated in FIG. 4, the circulation-type blasting device 1 includes a device body 2 that is installed adjacent to a worksite α of a steel bridge K as a work target. The device body 2 includes a pressure-feed hose 4, and an ejector 3 is connected to a tip of the pressure-feed hose 4. The ejector 3 ejects grit g and shot s. In addition, the device body 2 includes a suction hose 5, and a tip of the suction hose 5 is arranged at the worksite α. In this way, the used grit g', the used shot s', which are produced at the worksite α, and dust X, which contains foreign substances D such as the removed coat and the rust, can be suctioned via the suction hose 5. The dust-proof sheet, which is not illustrated, is spread at the worksite α so as to prevent leakage of the dust X to the outside, and a blower, a dust collector, and the like are also appropriately installed at the worksite α.

As illustrated in FIG. 4, in the device body 2 of the circulation-type blasting device 1, a grit hopper tank 10 and a shot hopper tank 20 are disposed adjacent to each other. In detail, the grit hopper tank 10 has a function of storing the grit g and the used grit g' (hereinafter a mixture of these will be referred to as grit G). The shot hopper tank 20 has a function of storing the shot s and the used shot s' (hereinafter a mixture of these will be referred to as shot S). Furthermore, a grit pressurizing tank 11 is connected to the grit hopper tank 10, and the grit pressurizing tank 11 pressure-feeds the grit G, which is stored in the grit hopper tank 10, to the worksite α. Similarly, a shot pressurizing tank 21 is connected to the shot hopper tank 20, and the shot pressurizing tank 21 pressure-feeds the shot S, which is stored in the shot hopper tank 20, to the worksite α.

Furthermore, dry compressed air supply means 30 is connected to the grit pressurizing tank 11 and the shot pressurizing tank 21 via a dry compressed air pipe 31. Such dry compressed air supply means 30 is constructed of an air compressor and an air dryer used to supply dry compressed air. The dry compressed air pipe 31 includes a selector valve 32, can selectively supply the dry compressed air to the grit pressurizing tank 11 or the shot pressurizing tank 21, and allows the shot to be loaded for ejection instead of the grit.

The pressure-feed hose 4 is connected to the grit pressurizing tank 11 and the shot pressurizing tank 21. With such a configuration, the grit G or the shot S is ejected from the ejector 3 via the pressure-feed hose 4 by a pressure of the dry compressed air, which is supplied from the dry compressed air supply means 30. In this way, the abrasive blast-cleaning or the shot peening can be performed on the steel bridge K as the work target. The ejection device (the blasting/shot peening ejection device) according to the present invention is constructed of the circulation-type blasting device 1 having the functions described so far.

The dust X, which contains the foreign substances D such as the used grit g' and the used shot s' accumulated at the worksite α and the removed coat, is collectively suctioned from one end of the suction hose 5. Then, the dust X, which is suctioned by the suction hose 5, reaches inside of a sorting chamber 40 disposed above the grit hopper tank 10 and the shot hopper tank 20.

A dust hose 51 is attached to the sorting chamber 40, and a dust collection section 50 as a removed coat collection section is connected to the dust hose 51. Furthermore, an air suction device 60 as dust suction means is connected to the dust collection section 50. Thus, the dust X can be suctioned by an air suction force of the air suction device 60.

In the sorting chamber 40, the dust X is sorted into the foreign substances D such as the used grit g', the used shot s', and the removed coat. The discharged foreign substances D are introduced into the dust collection section 50 via the dust hose 51 and accumulated in the dust collection section 50. Thereafter, the discharged foreign substances D are discharged in a waste bag 52 at desired timing and disposed as industrial waste.

In the configuration described above, the design of the present invention can appropriately be changed. For example, when the shot peening is performed by using the shot in order to improve the fatigue strength of the already-coated steel bridge, the preventive maintenance method may be executed in the following procedure. First, after the coat of the steel bridge is partially removed in a shot peening step, the coverage is calculated on the basis of the coat. Then, it is determined whether the coverage is the standard determination value or higher. If the calculated coverage is the standard determination value or higher, the peening step is completed. On the other hand, if the calculated coverage is lower than the standard determination value, the fluorescent coating material application step is performed to apply the fluorescent coating material to the portion subjected to the peening step. Then, the peening step is performed again. After the fluorescent coating material applied in the fluorescent coating material application step is partially removed, the portion applied with the fluorescent coating material is irradiated with the ultraviolet ray, and the coverage is calculated on the basis of the residual fluorescent coating material. If the calculated coverage is the standard determination value or higher, the peening step is completed, and the abrasive blast-cleaning step is then performed. Just as described, depending on a situation at the site, the abrasive blast-cleaning and the peening are preferably performed in a reverse order. With such a configuration, the first fluorescent coating material application step in the peening step of the first invention in the present invention can be omitted.

For example, the present invention may be applied to a newly-constructed steel bridge.

DESCRIPTION OF REFERENCE NUMERALS AND SYMBOLS

110 Weld site
111 End portion
120 R surface
C Remote camera section
CC Coverage checker
D Display
G Grit
S Shot
K Steel bridge
FIG. 1
S101 PREPARATION SUCH AS TEMPORARILY BUILDING SCAFFOLDS, SPREADING DUST-PROOF SHEET
S102 INSPECT OLD COATING, CONSTRUCTION TARGET
S103 ABRASIVE BLAST-CLEANING (FIRST-GRADE SURFACE PREPARATION)
S104 APPLY FLUORESCENT COATING MATERIAL
S105 SHOT PEENING
S106 DETERMINE COVERAGE
S107 CHECK BASE SURFACE
S108 COATING
S109 CHECK COATING
S110 CLEANING
S111 COLLECT DUST
SORT AND REUSE GRIT OR SHOT

What is claimed is:

1. A preventive maintenance method for a steel bridge comprising:
    performing, using grit as an abrasive, abrasive blast-cleaning on a portion of the steel bridge including a weld site where a first steel material is welded to another steel material, wherein the portion is subjected to surface preparation and has an abrasive blast-cleaned surface;
    after the abrasive blast-cleaning is performed on the portion, applying a fluorescent coating material to the portion;
    after the fluorescent coating material is applied to the portion, performing, using shot, shot peening on the portion in order to improve fatigue strength of the portion;
    after the shot peening is performed, partially removing the fluorescent coating material from the portion, and then, irradiating the portion with an ultraviolet ray;
    calculating coverage based on a residual fluorescent coating material that fluoresces;
    in response to determining that the coverage is less than a specified standard determination value that is 90%, applying the fluorescent coating material to the portion again, performing the shot peening on the portion, and determining whether the coverage is the specified standard determination value or higher;
    in response to determining that the coverage is the specified standard determination value or higher, determining that the shot peening is completed, wherein the determining that the shot peening is completed includes:
        applying the fluorescent coating material to the portion of the steel bridge again, performing the shot peening on the portion;
        determining whether the coverage is the specified standard determination value or higher; and
        in response to determining that the specified standard determination value or higher, determining that the shot peening is completed; and
    performing final finish coating to form a finishing coat on the portion after the shot peening is completed,
    wherein the weld site has a weld where the first material and the second steel material are joined to form a corner, the weld existing inside the corner, in a cross-sectional view,
    wherein, in the cross-sectional view, the weld site has a first gap between the weld and the first steel material and a second gap between the weld and the second material, wherein the shot peeing performs shot peening on portions of the weld adjacent to the first gap and the second gap to deform the portions to, in the cross-sectional view, (1) close the first gap and the second gap, and (2) have concave R surfaces, in order to increase an externally-visible area of the weld, and
    wherein whether the concave R surfaces is properly formed is determined using a ball gauge or a non-contact measuring instrument.

* * * * *